Oct. 21, 1969  R. W. BENNETT ET AL  3,473,909

METHOD OF RESHAPING GLASS PLATES WITH FLUID PRESSURE

Filed Dec. 21, 1966  2 Sheets-Sheet 1

INVENTORS.
ROBERT W. BENNETT
WENDELL S. BLANDING
LAWRENCE B. HAUSHEER
BY
Charles W. Gregg
AGENT United States Patent Office 3,473,909
Patented Oct. 21, 1969

3,473,909
METHOD OF RESHAPING GLASS PLATES
WITH FLUID PRESSURE
Robert W. Bennett, Corning, Wendell S. Blanding, Painted Post, and Lawrence B. Hausheer, Corning, N.Y., assignors to Corning Glass Works, Corning, N.Y., a corporation of New York
Filed Dec. 21, 1966, Ser. No. 603,593
Int. Cl. C03b 23/00
U.S. Cl. 65—106          8 Claims

ABSTRACT OF THE DISCLOSURE

A method of reforming previously formed thermoplastic articles such as glass lenses or the face plates of viewing panels for cathode-ray or television picture tubes. In such method such articles are suitably heated and are pressed against mold surfaces having configurations corresponding to that desired for such articles, such pressing being performed by a flexible, resilient or elastic membrane actuated by pressurized fluid.

---

The present invention relates to reforming thermoplastic articles. More particularly the present invention relates to reforming articles previously formed of a thermoplastic material such as glass.

In the forming of articles of molten thermoplastic material, such as glass for example, the configuration imparted to the articles during the forming operation oftentimes becomes distorted to a degree during the cooling of such articles. Such distortion is a result of uneven heat distribution in the equipment used in the forming operation and the resultant uneven heat distribution in formed articles during and subsequent to the forming thereof by said equipment, and during the cooling of such articles subsequent to said forming. In other words, a glass article may be in a thermally unbalanced condition during and following the forming thereof and such condition, during the cooling of such article, results in an uneven shrinkage of the glass of the article thereby causing distortion of the contour originally imparted to such article by said forming equipment.

With many articles formed from a thermoplastic material such as glass cooking vessels, bottles, jars, dishes etc. the above mentioned degree of distortion that may occur in the shapes of the articles is of such a minor degree that such distortion is not readily noticeable or detected by the human eye and is, therefore, not objectionable, or as in the case of bottles and jars, is not of a degree sufficient to preclude the use of such articles for their intended use. However, with some articles formed from a thermoplastic material, the desirable or permissible limits or degrees of variations in the shapes of the articles from selected standards therefor comprise relatively small ranges of variations. For example, it is desirable that spherical glass lenses be formed as near as possible to the tolerances specified for such lenses in order to eliminate extensive and, therefore, expensive grinding operations on the lenses. As a further example, the face plates of viewing panels for cathode-ray or television picture tubes must, within specified tolerable limits or ranges, conform in configuration to selected standards for the shapes of such face plates. During and following the forming of such viewing panels by a pressing operation, the shape of the face plates of some of such panels may, due to the conditions previously mentioned, become distorted to an intolerable degree, that is, to such a degree that the panels are not within the prescribed or specified limits or ranges of variations considered tolerable. Therefore, in order to improve the selectivity of pressed viewing panels, that is, in order to reduce the quantity of panels that are rejected for having face plates which are not within the ranges of the specifications for the shapes of such face plates, it has been found expedient to reform the face plates of the previously formed panels to reduce or eliminate the distortion in the shapes of such face plates and, thereby, to increase the number of panels that are within said specifications.

In the light of the foregoing discussion, it is an object of the present invention to provide a method of reforming previously formed thermoplastic articles or portions thereof.

It is another object of the present invention to provide a method of reforming previously mis-shaped articles such as glass lenses or face plates of viewing panels for television picture tubes, or portions of such articles.

It is another object of the invention to provide a method of reforming, to a relatively precise degree, previously formed thermoplastic articles or portions thereof, which become distorted in shape during or following the forming thereof.

In accomplishing the above objects of the invention, an article to be reformed is suitably heated and such article, or the portion thereof to be reformed, is then pressed against a mold surface having a configuration corresponding to that desired for the article or said portion thereof. The pressing of said article or said portion thereof is performed by use of a flexible, resilient or an elastic membrane actuated by pressurized fluid.

Other objects and characteristic features of the invention will become apparent as the description proceeds.

It is pointed out that the term pressurized fluid as employed herein is intended to include compressed air or other compressed gases, as well as liquids under pressure.

The invention will best be understood with reference to the accompanying drawings wherein.

Figure 2:
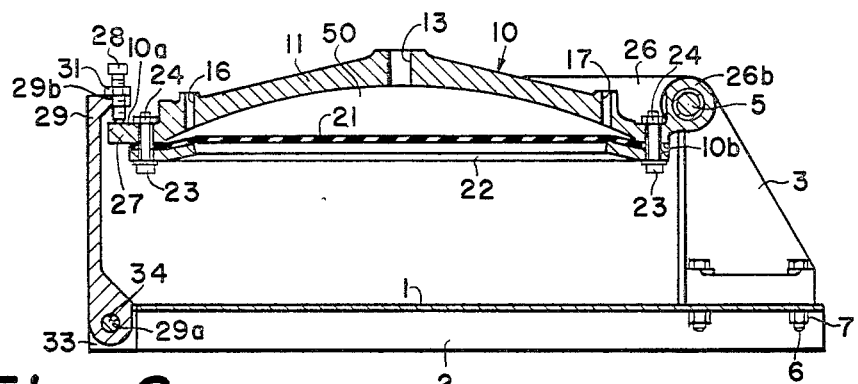
FIG. 2 is a sectional view of the apparatus of FIG. 1 taken generally along line II—II of FIG. 1.
Figure 3:
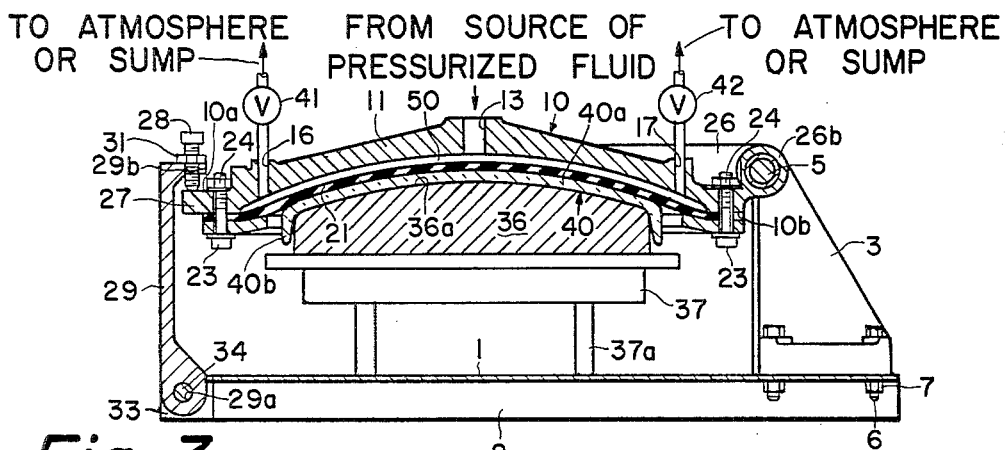
Figure 4:
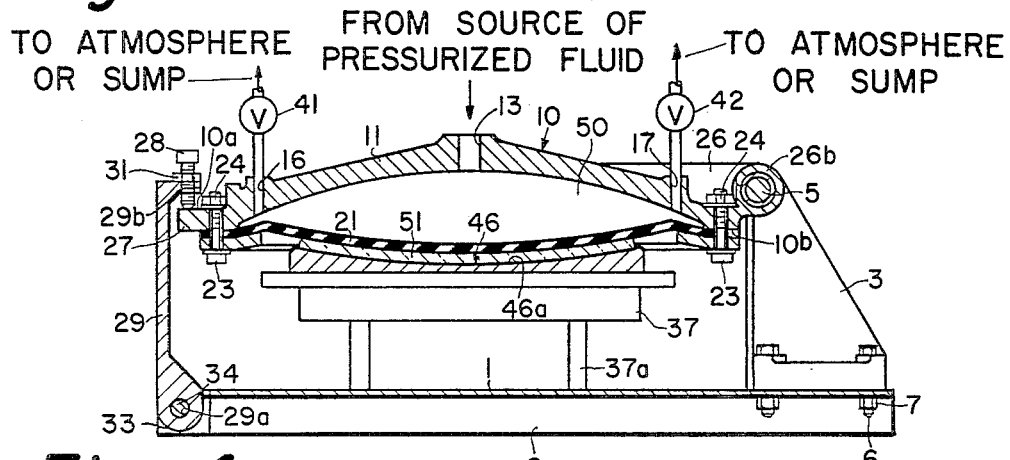

FIG. 3 comprises a view similar to FIG. 2 and illustrating several steps in the practice of the invention when reforming a portion of a thermoplastic article against a convex mold surface;

FIG. 4 comprises a view similar to FIG. 3 but employing a concave mold surface rather than a convex surface as in FIG. 3.

Similar reference characters refer to similar parts in each of the figures of the drawings.

Referring to the drawings in detail, there is provided a table or platform 1 of a relatively rigid material and which, if found necessary, is reinforced across the bottom thereof by angle or channel members, such as 2. On one end of the top of table 1 there is mounted first and second triangularly shaped upright support members 3 and 4. Members 3 and 4 are spaced apart from each other and the top of member 3 includes a bearing portion 3a for receipt and support of one end of an axle or shaft 5 which is a pivot pin for a hinge arrangement or assembly to be hereinafter further discussed. Similarly, member 4 includes at the top thereof a bearing portion 4a for receipt and support of the other end of axle or shaft 5. Support member 3 and 4 are secured to the top surface of table 1 by bolts, such as 6, extending down through feet, provided on the bottoms of the support members, and then through table or platform 1. Nuts, such as 7, are screwed onto the bottoms of said bolts and tightened to securely mount support support members 3 and 4 on table 1 as illustrated in the drawings.

Figure 1:
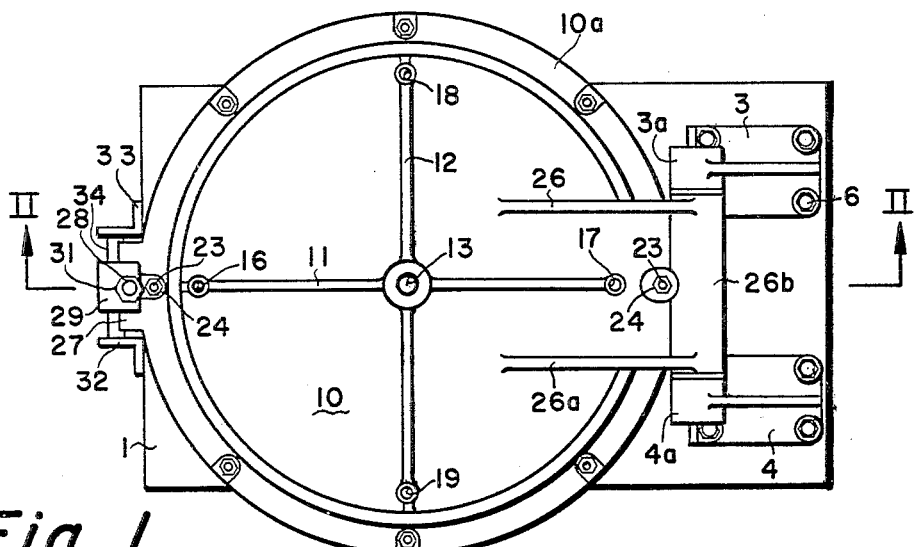
FIG. 1 is a top plan view of part of an apparatus to be used in the practice of the invention.

Referring to FIG. 1 there is shown a slightly domed circular plate 10 made of a rigid material such as aluminum, steel etc. and having an outer annular rim portion 10a. Plate 10 is illustrated as having on its upper surface ribs 11 and 12 which cross each other at a 90° angle in the center of such plate at which point there is provided in the plate a passageway 13 extending through the plate. Ribs 11 and 12 are not necessarily required but, without adding excessive weight to plate 10, reinforce the plate against possible distortion thereof if the plate is made of relatively thin material. There is provided at first and second ends of rib 11, first and second passageways 16 and 17, respectively, which also extend through plate 10 but are of smaller diameter than passageway 13. First and second passageways 18 and 19, similar to passageways 16 and 17, are provided at first and second ends of rib 12, respectively. The purpose of said passageways will be discussed hereinafter. It is pointed out that plate 10 need not necessarily be circular as illustrated in FIG. 1 but may have an elliptical, substantially rectangular, or other shape if desired or expedient for the reforming of articles or portions thereof. This will become readily apparent hereinafter in this description.

The outer border 21a of a circular elastic or resilient heat-resistant and hermetic membrane 21 (FIG. 2) of the same diameter as plate 10 is disposed against bottom surface 10b of previously mentioned rim portion 10a of plate 10, and said border is secured to surface 10b, in a hermetic relationship therewith, by an annular clamp member 22 and bolts, such as 23, which extend upwardly through said clamp at eight points preferably equally spaced around said clamp, and then extend upwardly through border 21a of membrane 21 and rim portion 10a of plate 10. Nuts, such as 24, are screwed onto the upper ends of the bolts, such as 23, and are tightened to squeeze border 21a of membrane 21 between clamp member 22 and said bottom surface 10b of portion 10a of plate 10, and, thereby, provide said hermetic relationship between border 21a of membrane 21 and said surface 10b. This arrangement will be readily understood by a brief study of the drawings.

Plate 10 further includes a pair of rib members 26 and 26a which extend from one side of the plate beyond the outer periphery of rim portion 10a of plate 10 and have formed on the ends thereof a bearing portion 26b through which extends the previously mentioned axle or shaft 5 to complete the hinge assembly or arrangement also previously mentioned. By such arrangement it is obvious that plate 10 is supported by upright supports 3 and 4 and such plate is movable through an arc of travel extending from the horizontal position shown in FIGS. 2, 3 and 4 of the drawings to at least a vertical position. The side of rim portion 10a of plate 10 opposite said one side of the plate, that is, opposite the side provided with the hinge arrangement described above, is provided with an extension 27 which protrudes outwardly beyond the remainder of the outer periphery of rim portion 10a of plate 10. Extension 27 provides a seat for a hold-down bolt 28 of a clamping device 29 described below, On the end of table or platform 1, opposite that on which supports 3 and 4 are mounted, are provided first and second spaced-apart lugs 32 and 33 which are securely fastened to said table in any convenient manner, such as by welding for example. The lower end of previously mentioned clamping device 29 is provided with a hole 29a, and a pivot pin or axle 34 extends through such hole and into cooperating holes provided in lugs 32 and 33. It is thus apparent that clamping device 29 is pivotally mounted on said end of table or platform 1 and may be swung or moved thorugh on arc of travel into or away from its position shown in the drawings. The upper end of clamping device 29 has an extending portion 29b through which the previously mentioned hold-down bolt 28 vertically extends, such bolt being screwed into cooperating threads provided in said portion 29a. A lock nut 31 is also provided on bolt 29 and, after bolt 28 is screwed through portions 29b of clamping device 29 to a desired distance, lock nut 31 may be tightened against the top surface of portion 29b of clamping device 29 to lock bolt 28 in said portion. As previously mentioned, the lower end of bolt 28 seats against the top surface of extension 27 on rim portion 10a of plate 10. Clamping device 29 is thus used to clamp plate 10 down in its horizontal position illustrated in FIGS. 2, 3 and 4 of the drawings. The purpose of such clamping will become apparent as the description proceeds.

Referring now to FIG. 3 of the drawings, an example of the inventive method herein disclosed will be set forth.

It will be assumed that it is desired to reform the face plate 40a of a viewing panel 40 for a circular glass television picture tube. In such case, there is provided a mold 36 having a circular outer periphery corresponding generally to the inner surface of the depending skirt portion 40b of panel 40, and a convex top mold surface 36a conforming to the configuration desired to be imparted to face plate 40a of viewing panel 40. There is disposed on the top of table or platform 1 a stand 37, having feet, such as 37a which rest on the top of such table or platform. The heights of mold 36 and stand 37 are such that top surface 36a of mold 36 will extend above bottom surface 10b of annular rim portion 10a of plate 10 when such plate is in its horizontal position as illustrated in FIGS. 2, 3 and 4 of the drawings. Viewing panel 40 and mold 36 are first heated to near the softening point temperature, but below the melting point temperature, of the glass of which panel 40 is made, such heating being performed in a suitable oven, for example. The mold and panel may be heated together or, if found to be desirable or expedient, heated separately and later placed together. However, as is well known, mold 36 must be properly heated so as not to cause excessive thermal shock to the heated viewing panel upon its later being placed upon the mold if the mold and panel are heated separately.

Prior to or during the above mentioned heating of viewing panel 40 and mold 36, clamping device 29 is pivoted about its pivot pin 34, and the bottom end of bolt 28 in the upper end of device 29 is, thereby, moved from its seat on the top surface of extension 27 of rim portion 10a of plate 10 to unclamp such plate. Plate 10 is then swung upwardly about pivot pin 5 of the hinge assembly of such plate and to a substantially vertical position. Following completion of the heating of viewing panel 40 and mold 36, mold 36 is disposed on the top of stand 37 with the inner surface of face plate 40a of viewing panel 40 resting on top surface 36a of mold 36. The transfer of viewing panel 40 and mold 36 from their heating apparatus is performed as rapidly as possible to prevent undue cooling of the panel and mold. Plate 10 is then lowered towards its horizontal position and flexible membrane 21 contacts the top surface of face plate 40a of panel 40 and then stretches or, stated more accurately, is stretched to generally cover said surface. Clamping device 29 is then returned to its clamping position to prevent plate 10 from rising back up under the force of the stretched membrane 21, that is, to maintain such membrane down against the face plate of the panel. The apparatus is then in the position shown in FIG. 3 of the drawings.

Immediately following the clamping of the plate 10 in its closed position as discussed above, passageway 13 in the center of plate 10 is connected to a source of pressurized fluid such as compressed air, for example. Such pressurized fluid flows into the space or chamber 50 between the bottom surface of plate 10 and the upper surface of membrane 21 and subsequently presses down on such membrane with a force or pressure in accordance with that of said source of pressurized fluid. Said force presses membrane 21 down against face plate 40a of viewing panel 40 and, in turn, such membrane presses face plate 40a down against the top surface 36a of mold 36 to reform such face plate to conform to the shape of top surface 36a. It will be noted that passageways 16 and 17 in plate 10 are shown in FIG. 3 (also in FIG. 4) as connected to first and second fluid control valves 41 and 42, respectively. It will be understood that passageways 18 and 19 in plate 10 are similarly connected to fluid control valves similar to 41 and 42 but not shown in the drawings for purposes of simplification thereof. Such valves are normally in a closed position but are actuable to an open position, when desired, to vent some or all of the pressurized fluid supplied to space or chamber 50 to atmosphere, or to a suitable sump if so desired. The valves such as 41 and 42 may be partially opened, for example, to permit the pressurized fluid, supplied to chamber 50 through passageway 13, to flow through such chamber and out through said valves, thereby providing cooling of membrane 21 and of face plate 40a if found desirable or expedient to do so without undue reduction of the pressure of the pressurized fluid that is pressing membrane 21 down against face plate 40a of viewing panel 40. Of course, if found necessary to do so, the pressure of said source of pressurized fluid can be increased to permit opening valves 41 and 42 to any extent desired and still maintain the required pressure in chamber 50.

After face plate 40a has been pressed into conformity with the shape of top surface 36a of mold 36 and has cooled sufficiently to become set-up in its reformed shape, the pressurized fluid source is again disconnected or shut off from passageway 13, plate 10 is again raised to its vertical open position and panel 40 is permitted to further cool, the panel beng preferably removed from mold 36 for such additional cooling in order to reduce the possibility of the panel sticking to the mold. The panel can then be transferred to an annealing apparatus, or can be permitted to cool to room temperature and later reheated for annealing thereof.

It is pointed out that, although the method described above is discussed in conjunction with reforming a viewing panel for a circular television picture tube, the article to be reformed could as well be an article having a configuration other than the shape of such a viewing panel. A further example of the practice of the invention will, therefore, be briefly discussed in conjunction with FIG. 4 of the drawings.

Assuming that it is desired to reform a spherical diverging concavo-convex optical lens previously formed from a molten glass composition, such as lens 51 shown in FIG. 4, there may be provided a mold surface 46 having a concave top mold surface 46a corresponding to the configuration desired to be imparted to the lens such as 51. The mold and lens are heated as previously described in conjunction with viewing panel 40 and are then disposed on the top of stand 37 as illustrated in FIG. 4. Plate 10 is then moved to its horizontal position and clamped, as also previously discussed and as shown in FIG. 4. Pressurized fluid is then supplied to orifice 13 and enters chamber 50 to press membrane 21 down against the concave surface of lens 46 and the convex surface of such lens against the concave top surface 46a of mold 46. Lens 46 is, thereby, reformed to conform to the shape of top surface 46a of mold 46. If found necessary for cooling of membrane 21 and lens 46, valves such as 41 and 42 may be opened, as previously discussed, to provide a flow of the pressurized fluid through chamber 50 for the cooling of the membrane and lens. After lens 51 has cooled sufficiently to become set-up, such lens may be handled as discussed in conjunction with viewing panel 40.

The use of a flexible or resilient membrane, such as 21, actuated by pressurized fluid to reform thermoplastic articles or portions thereof which are heated to the softening temperatures of such articles, has an advantage over the use of pressing plungers of prescribed configurations for such reforming. This advantage is that the pressure applied against a thermoplastic article which is being pressed is evenly distributed by the membrane over the membrane-contacted surface of such article. In other words the pressing force of the pressurized fluid supplied to chamber 50 is, at any selected point on the top surface of membrane 21, substantially equal to that at any other point on such top surface and, thus, said thermoplastic article or portion thereof being reformed is subjected by said membrane to equal pressure substantially across the membrane-contacted surface of such article or said portion thereof.

In the light of the two foregoing examples of reforming thermoplastic articles or a portion thereof, it will be apparent that the method herein disclosed can be employed for reforming many different glass or other thermoplastic articles or selected portions of such articles.

What is claimed is:
1. The method of reforming a portion of a glass article, such method comprising,
  (A) heating at least said portion of said article to near the softening temperature but below the melting temperature of said glass,
  (B) disposing one surface of said heated portion of said article adjacent a heated mold;
  (C) disposing against the other surface of said portion of said article a resilient hermetic membrane which is hermetically sealed around the edges thereof to the periphery of a corresponding area of one of the surfaces of a rigid plate, the space between said membrane and said plate surface being connectable to a source of pressurized fluid;
  (D) connecting said space to said pressurized fluid source to press said membrane against said article and thereby said portion of said article against said mold to reform such portion,
  (E) maintain said space connected to said pressurized fluid source while permitting said portion of said article to cool and become set up,
  (F) relieving said pressure and moving said membrane out of contact with said article, and
  (G) removing said portion of said article from out of contact with said mold to permit such portion to further cool.

2. The method in accordance with claim 1 and including a further step of annealing said article following the removal of said portion thereof from contact with said mold.

3. The method in accordance with claim 1 and in which said article is a viewing panel for a television picture tube and said portion thereof is the face plate of such panel.

4. The method of reforming the face plate of a glass viewing panel for a cathode-ray tube, such method comprising,
  (A) heating said viewing panel to near the softening temperature of the glass of which such panel is formed;
  (B) disposing one surface of said face plate adjacent the surface of a heated mold, such surface having a configuration corresponding to that desired for such face plate,
  (C) disposing a first face of a resilient hermetic membrane adjacent the second surface of said face plate, such membrane being hermetically sealed around the edges thereof to the periphery of an area of one of the surfaces of a rigid plate, such area corresponding in areal configuration to the areal configuration of said first face of the membrane, the space between the second face of said membrane and said area of said plate being connectable to a source of pressurized fluid;
  (D) connecting said source to said space to supply thereto pressurized fluid to press said first face of said membrane against said second surface of said face plate and thereby said first surface of such face plate against said surface of said mold to force the face plate into conformity with said configuration of such mold surface;
(E) maintaining said pressurized fluid supplied to said space while permitting said panel to cool to the temperature of the annealing point of the glass of which such panel is formed,
(F) releasing said pressurized fluid following the cooling of said glass to its annealing point temperature; and
(G) following the release of said fluid, removing said membrane from adjacent said second surface of said face plate and said first surface of such face plate from in contact with said surface of said mold to permit said panel to further cool.

5. The method in accordance with claim 4 and including the further step of annealing said panel following the removal thereof from said surface of said mold.

6. The method in accordance with claim 1 and in which said article is a glass lens.

7. The method in accordance with claim 2 and in which said article is a glass lens.

8. The method in accordance with claim 2 and in which said article is a viewing panel for a television picture tube and said portion thereof is the face plate of such panel.

References Cited

UNITED STATES PATENTS

| | | | |
|---|---|---|---|
| 3,004,295 | 10/1961 | Bottoms et al. | 65—106 X |
| 3,244,497 | 4/1966 | Copeland | 65—356 X |

ARTHUR D. KELLOGG, Primary Examiner

U.S. Cl. X.R.

65—110, 273, 275, 356